US00RE48480E

(19) United States
(12) Reissued Patent
Babikian et al.

(10) Patent Number: US RE48,480 E
(45) Date of Reissued Patent: Mar. 23, 2021

(54) BABY CHANGING STATION

(71) Applicant: BOBRICK WASHROOM EQUIPMENT, INC., North Hollywood, CA (US)

(72) Inventors: Dikran Babikian, Glendale, CA (US); Branko Bem, Plano, TX (US)

(73) Assignee: Bobrick Washroom Equipment, Inc., North Hollywood, CA (US)

(21) Appl. No.: 16/167,416

(22) Filed: Oct. 22, 2018

Related U.S. Patent Documents

Reissue of:
(64) Patent No.: 8,365,328
Issued: Feb. 5, 2013
Appl. No.: 12/543,173
Filed: Aug. 18, 2009

U.S. Applications:
(63) Continuation-in-part of application No. 12/221,918, filed on Aug. 6, 2008, now Pat. No. 8,375,490.

(51) Int. Cl.
*A47C 16/00* (2006.01)
*A47D 5/00* (2006.01)

(52) U.S. Cl.
CPC ..... *A47D 5/006* (2013.01); *A47D 5/003* (2013.01); *Y10T 29/49826* (2015.01)

(58) Field of Classification Search
CPC ..... A47D 5/00; A47D 5/003; A47D 5/006
See application file for complete search history.

(56) References Cited

U.S. PATENT DOCUMENTS

| | | | | |
|---|---|---|---|---|
| 3,999,490 | A | 12/1976 | Rocker et al. | A47D 5/006 108/27 |
| 4,363,459 | A | 12/1982 | Holzer | E06B 9/323 248/257 |
| 4,573,608 | A | 3/1986 | Hansen | A47D 5/003 221/92 |
| 5,086,527 | A * | 2/1992 | Takahashi et al. | A47D 5/003 108/38 |
| 5,754,999 | A | 5/1998 | Helmsderfer | A47D 5/003 108/38 |

(Continued)

FOREIGN PATENT DOCUMENTS

| | | |
|---|---|---|
| DE | 1 975 363 | 12/1967 |
| DE | 1975363 U * | 12/1967 |

(Continued)

OTHER PUBLICATIONS

English Translation of JP 2005-143635.*

*Primary Examiner* — Sara S Clarke
(74) *Attorney, Agent, or Firm* — Lewis Roca Rothgerber Christie LLP

(57) ABSTRACT

A baby supporting device is provided which includes a frame. The frame includes a first portion for mounting onto a wall and a second portion pivotally coupled to the first portion and rotatable between a first position and a second position. A first stop member extends from the first portion, and a second stop member extends from the second portion, such that when the second stop member engages the first stop member it stops the second portion at the second position. A first surface covers at least a portion of the first portion, and a second surface covers at least a portion of the second portion.

22 Claims, 7 Drawing Sheets

(56) References Cited

U.S. PATENT DOCUMENTS

| | | | | |
|---|---|---|---|---|
| 5,906,015 | A | 5/1999 | Hilger et al. | A47D 5/003 5/133 |
| 6,032,310 | A | 3/2000 | Helmsderfer et al. | A47D 5/003 5/136 |
| 6,055,688 | A | 5/2000 | Helmsderfer et al. | A47D 5/003 5/136 |
| 6,151,737 | A | 11/2000 | Henninge | A47C 17/40 5/136 |
| 6,269,503 | B1 | 8/2001 | Betker | A47D 5/003 5/655 |
| 7,331,551 | B2 | 2/2008 | Oddsen, Jr. | F16M 11/10 248/278.1 |
| D620,724 | S | 8/2010 | Presnell | D6/391 |
| 2002/0195911 | A1 | 12/2002 | Allen | D06F 81/06 312/241 |
| 2008/0209632 | A1* | 9/2008 | Presnell et al. | 5/136 |
| 2008/0209635 | A1* | 9/2008 | Gonzalez | A61G 7/05769 5/600 |

FOREIGN PATENT DOCUMENTS

| | | | | |
|---|---|---|---|---|
| JP | 11-299592 | | | 11/1999 |
| JP | 11-299592 | A | * | 11/1999 |
| JP | 2002-000410 | A | * | 1/2002 |
| JP | 2003-052494 | | | 2/2003 |
| JP | 2003-52494 | A | * | 2/2003 |
| JP | 2005-143635 | A | * | 5/2005 |
| JP | 2005-143635 | | | 6/2005 |
| WO | WO 00/26100 | | | 5/2000 |
| WO | WO00/26100 | A | * | 5/2000 |

* cited by examiner 34
20
62
62
40
63
110
146
7B
7B

BABY CHANGING STATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

[This application is a continuation-in-part application of application Ser. No. 12/221,918 filed on Aug. 6, 2008, the entire content of which is incorporated herein by reference.] *The present application is a reissue of U.S. Pat. No. 8,365,328 issued Feb. 5, 2013, filed as U.S. application Ser. No. 12/543,173 on Aug. 18, 2009, which was a continuation-in-part application of U.S. application Ser. No. 12/221,918 filed on Aug. 6, 2008, now U.S. Pat. No. 8,375,490, the entire contents of which are incorporated herein by reference.*

BACKGROUND

Baby changing stations are widely used, especially in public facilities. Conventional baby changing stations generally have a base that is mounted vertically onto a wall and a support platform that is hingedly mounted directly to the base. Typically, the base and platform are formed from a resinous or plastic material and react a majority, if not all, of the loads that the baby changing station is exposed to. Conventional baby changing stations are sufficiently strong to support the weight of a baby or a toddler. However, when excess weight is placed on such stations, as for example when an adult exerts his or her own weight on the changing station or when two children are placed on the baby changing station, the weight limits of a baby changing station may be exceeded and the baby changing station may fail, possibly causing injury to those being supported by it. Therefore, stronger baby changing stations capable of withstanding excess loads are desired.

SUMMARY OF THE INVENTION

In an exemplary embodiment, a baby supporting device is provided including a frame having a base portion for mounting onto a wall, a platform portion pivotally coupled to the base portion, the platform portion including a first rotatable section and two spaced apart arms extending from the first rotatable section, the first rotatable section rotating about a longitudinal axis. The device also includes a bracket coupled to the base portion, such that the bracket surrounds at least a portion of and supports the platform portion first rotatable section and allows the platform portion first rotatable section to rotate within the bracket relative to the bracket about the longitudinal axis, whereby rotation of the first rotatable section causes the platform portion to pivot relative to said base portion. The device also requires a first stop member extending from the first rotatable section, and a second stop member extending from the base portion, where the second stop member is engageable by the first stop member for stopping the rotation of the first rotatable section in a first direction. Moreover, the device requires a base covering at least a portion of the base portion, and a platform for supporting the baby extending over at least a portion of the frame platform portion. In a further exemplary embodiment, the device also includes an actuator connected to the base portion and the platform portion for providing a force for urging the platform portion to rotate toward the base portion. In yet another exemplary embodiment, the second stop member is an arcuate member, the frame platform portion first rotatable section is a tubular member, and the arcuate second stop member is connected to the tubular member outer surface. In yet another exemplary embodiment, the platform includes a first portion defining a supporting surface for supporting the baby and a second portion, wherein the arms are sandwiched between the first and second platform portions. In yet a further exemplary embodiment, each of the arms is a plate extending along a generally vertical plane. In a further exemplary embodiment, the device includes another bracket coupled to the base portion, the another bracket being spaced apart from the bracket and surrounding at least a portion of and supporting the platform portion first rotatable section and allowing the platform portion first rotatable section to rotate relative to the another bracket. In an exemplary embodiment, each bracket is generally U-shaped. In yet another exemplary embodiment, the second stop member engages the first stop member at a location which is at a level not above and not below the first rotatable section.

In another exemplary embodiment, a baby supporting device is provided including a frame having a base portion for mounting onto a wall, a platform portion pivotally coupled to the base portion, the platform portion including a first rotatable section and two spaced apart arms extending from the first rotatable section, the first rotatable section penetrating the base portion and rotating about a longitudinal axis. The device also has a first stop member extending from the first rotatable section, and a second stop member extending from the base portion, where the second stop member is engageable by the first stop member for stopping the rotation of the first rotatable section in a first direction. The device also includes a base covering at least a portion of said base portion, and a platform for supporting the baby extending over at least a portion of the frame platform portion. In an further exemplary embodiment, the second stop member engages the first stop member at a location which is at a level not above and not below the first rotatable section.

In another exemplary embodiment, a method is provided for mounting a baby changing station to wall. The method includes providing a frame first member, mounting the first member to the wall, mounting a baby support surface on a frame second member, and connecting the frame second member to the frame first member, whereby the second member can rotate relative to the first member for rotation of the support surface relative to the first member. In another exemplary embodiment, the method further includes connecting an actuator to the first member, and connecting the actuator to the second member. In yet another exemplary embodiment, connecting includes mounting brackets onto the first member for supporting the second member.

In a further exemplary embodiment, a baby supporting device is provided including a frame including a first portion and a second portion rotatably coupled to the first portion, a cover covering the first portion, and a platform including a first piece defining a bed for receiving a baby. The first piece includes a peripheral edge and a shoulder formed proximate the peripheral edge. The device also includes a second piece coupled to the first piece, wherein at least part of the frame second portion is sandwiched between the first and second pieces. The second piece includes a peripheral edge adjacent the first shoulder, a depression, and a second shoulder. The device also includes a trim piece. The trim piece includes a projection received in the depression and a third shoulder proximate the second shoulder. In yet a further exemplary embodiment, the third shoulder engages the second shoulder and wherein when the third shoulder engages the second shoulder and the projection is received in the depression, a tension is created between the third shoulder and the projection for retaining the trim piece on the second piece. In another exemplary embodiment, the trim piece includes a peripheral edge extending beyond the first shoulder in a direction away from the second piece.

In another exemplary embodiment, a baby supporting device is provided including a frame including a first portion and a second portion rotatably coupled to the first portion, a cover covering the first portion, and a platform including, a depression, and a second shoulder. The device also includes and a trim piece including a projection received in the depression and a third shoulder proximate the second shoulder. In yet another exemplary embodiment, the third shoulder engages the second shoulder and wherein when the third shoulder engages the second shoulder and the projection is received in the depression, tension is created between the third shoulder and the projection for retaining the trim piece on the second piece.

DETAILED DESCRIPTION OF THE INVENTION

In the following description, only certain exemplary embodiments of the present invention are shown and described by way of illustration. As those skilled in the art would recognize, the invention may be embodied in many different forms and should not be construed as being limited only to the embodiments set forth herein.

It should be noted that the terms "upper" and "lower" as used herein are terms used to denote the relative position of objects and not necessarily the exact position of such objects. For example, a "lower" object may in certain situations be located over an "upper" object.

In an exemplary embodiment of the present invention, a baby changing station ("BCS") is provided that includes a frame. The frame includes a base portion and a platform portion. The frame platform portion is pivotally coupled to the frame base portion. The frame in an exemplary embodiment is formed from metallic materials. However, in other embodiments, it may be formed from other high strength materials, such as composite materials. The frame base portion is mountable onto a wall. A cover is mounted over the base frame portion. Such cover may be mounted to the base frame portion directly and/or to the wall. A platform is mounted over the frame platform portion.

Figure 1:
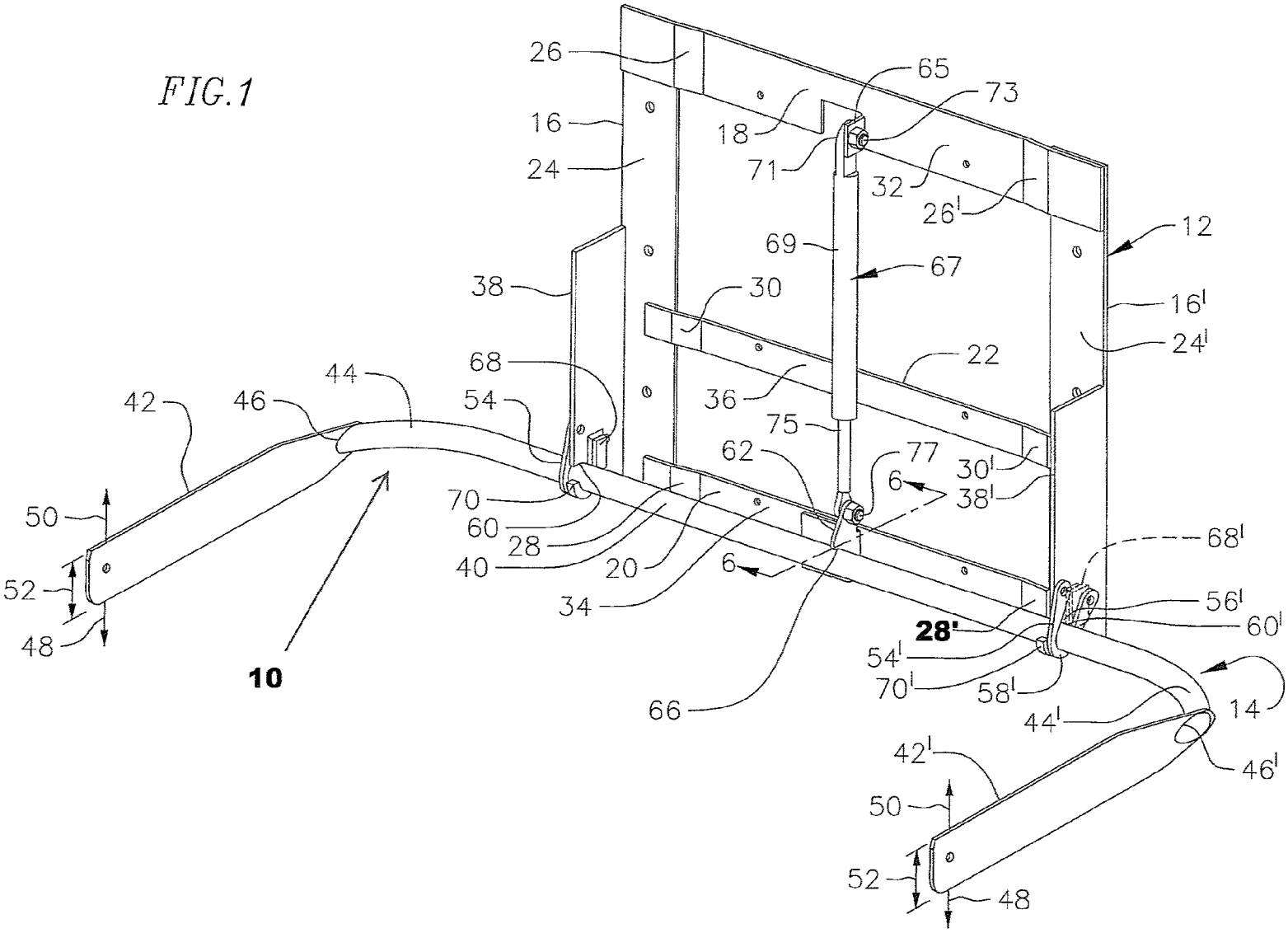
FIG. 1 is a perspective view of an exemplary embodiment frame incorporated in an exemplary embodiment baby changing station of the present invention.

An exemplary BCS of the present invention includes a frame 10 having frame base portion 12 and frame platform portion 14, as shown in FIG. 1. In an exemplary embodiment as shown in FIG. 1, the frame base portion is generally a rectangular or a square member formed by first and second lateral members 16, 16', respectively, which are interconnected by first and second transverse members 18 and 20, respectively. In an exemplary embodiment, a third transverse member 22 may be provided interconnecting the two lateral members 16, 16'. In the shown exemplary embodiment, the third transverse member 22 is positioned between the first and second transverse members 18 and 20. In the shown exemplary embodiment, each of the lateral members is welded to the transverse members. In other exemplary embodiments, these members may be connected to each other using other fastening means such as adhesives or fasteners. In an exemplary embodiment as shown in FIG. 1, the transverse members are connected to a front surface 24, 24' of each of the lateral members. In the shown exemplary embodiment, the first, second and third transverse members include joggled portions 26, 28 and 30, respectively, proximate the first lateral member 16 and joggled portions 26' 28' and 30', respectively proximate the second lateral member 16'. In this regard, middle portions 32, 34, and 36 of the transverse members are set back from the front surfaces 24, 24' of the lateral members.

A member 38, 38' referred to herein as a "support member" extends from each of the lateral members 16, 16', respectively. In the shown exemplary embodiment, each of these members is a flat panel which may be welded or otherwise attached to its corresponding lateral member or may be integrally formed with its corresponding lateral member. For example, the member 38, 38' may be part of the lateral member 16, 16', respectively, and then bent forward, as for example shown in FIG. 1.

In an exemplary embodiment as shown in FIG. 1, the frame platform portion 14 includes a main section 40 which is generally tubular and which is pivotally coupled to the frame base portion so as to be able to rotate about a central longitudinal axis of the main section. At either end of the tubular section, attached generally flat arm portions 42 and 42'. The arm portions 42, 42' in the exemplary embodiment as shown in FIG. 1, are welded onto the ends of the main section 40. In an exemplary embodiment, opposite end portions 44, 44' of the main section 40 are curved. In the exemplary embodiment shown in FIG. 1 where the end portions 44, 44' are tubular and curved, they have an oval cross-section 46, 46' as viewed along the plane of their corresponding arm portions 42, 42', which is parallel to a plane generally perpendicular to a main section portion between the end portions. If a straight tubular section is used as the main section without having curved end portions, the cross-section of the ends of the main tubular section as viewed along such plane of the their corresponding arm portions would be circular. In the shown exemplary embodiment, a transverse load (i.e., a load directed downward or upward as shown by arrows 48, 50, respectively) on each arm will be reacted in shear along the oval cross-sections of the tubular end portions. In addition, by having the arm portions being flat members that are oriented along a generally vertical plane and having a height 52, they are able to withstand a higher bending loads along their length, i.e., loads which are caused when a force is applied along arrows 48 or 50 than if they were members of shorter heights.

Figure 2:
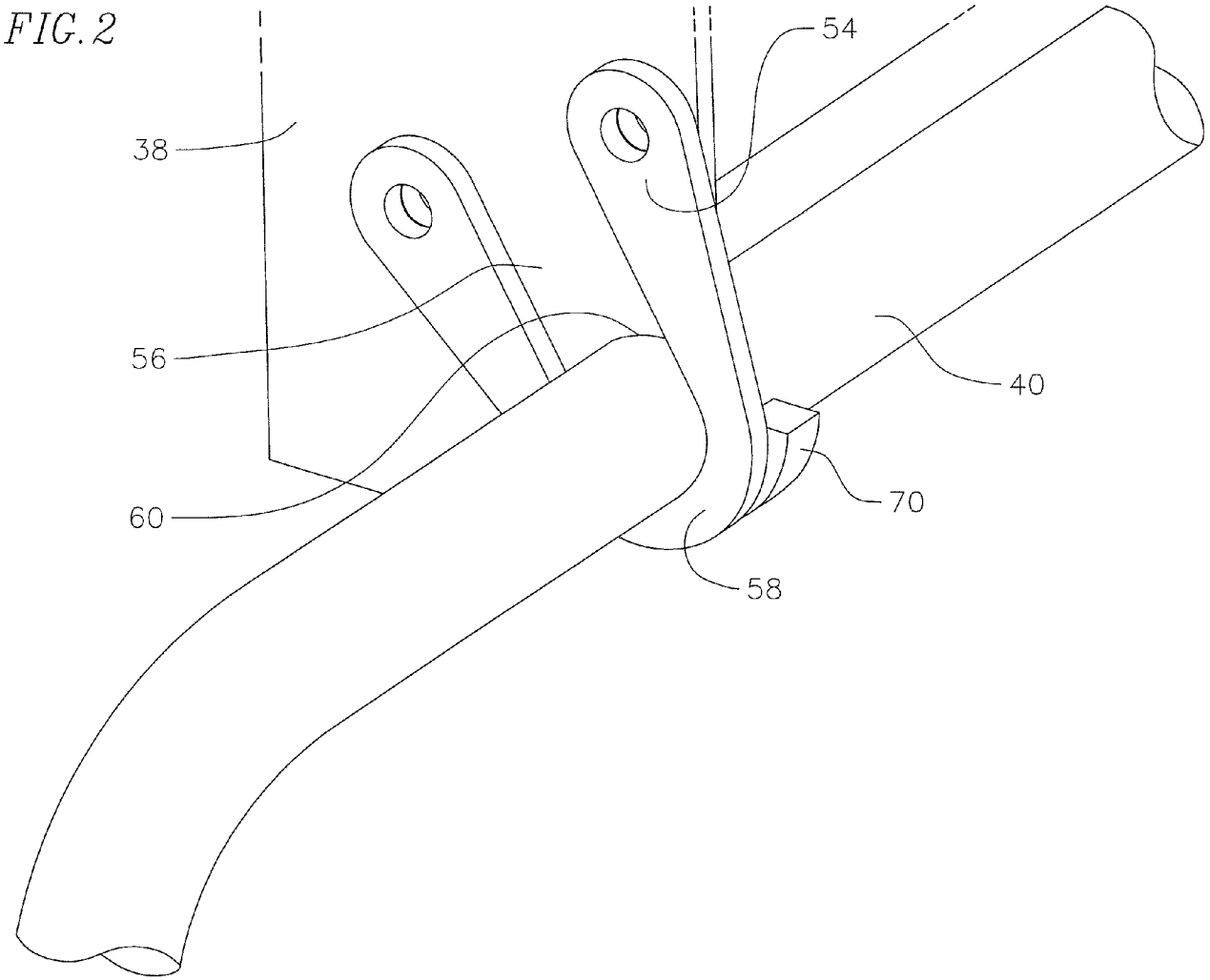
FIG. 2 is a partial perspective view of the frame shown in FIG. 1 showing a bracket supporting a platform portion of the frame.

In an exemplary embodiment, as shown in FIGS. 1 and 2, a bracket portion, (referred to herein as a "bracket" for convenience) 54, 54' is attached to the support members 38, 38', respectively. More specifically, each bracket 54, 54' is a generally U-shaped defining a channel 56, 56' having a curved base 58, 58' to accommodate frame platform main section 40. In the shown exemplary embodiment, the support members 38, 38' have a cut-out 60, 60' complementary to the shape of the main section 40 of the frame platform portion. In this regard, the main section 40 is sandwiched between the cutouts 60, 60' formed on the support members 38 and 38' and the corresponding brackets 54, 54', respectively such that it is supported by the brackets 54, 54' while being able to rotate relative to the brackets 54, 54' and the support members 38, 38'. In an exemplary embodiment, a bracket 62 may extend from the second transverse member 20 proximate the middle of the transverse member. In the shown exemplary embodiment, the bracket 62 has a portion 64 extending forward of the transverse member 20. A cut-out 66 in the shape of a portion of a circle complementary to the outer surface of the tubular member 40 defining the main section of the frame platform portion is formed such that the tubular member defining the main section is fitted within the cut-out and is able to rotate relative to the cut-out. In an exemplary embodiment, the cut-out is formed such that when the tubular member is inserted in the cut-out, a portion of the bracket member 62 extends underneath the tubular member for providing support.

In other exemplary embodiments, instead of a tubular main section, the frame platform portion main section may have other geometric shapes in cross-section. For example, the main section may be polygonal in cross-section as viewed along a vertical plane. In such case, the section may have to be modified in the areas that it is supported by the brackets 54 so as to allow it to rotate relative to the brackets.

A stop member 68, 68' is attached to each of the support members 38, 38'. In an exemplary embodiment, the stop members 68, 68' may be welded or otherwise attached to the support members or may be formed integrally with the support members. It should be noted that in an exemplary embodiment, the brackets 54, 54' are attached to exterior surfaces of the support members 38, 38'. With this exemplary embodiment, the stop members 68, 68' are attached to the interior surfaces of their respective support members 38, 38'. In other exemplary embodiments, this arrangement may be reversed where the brackets are attached to the interior surfaces of the support members and the stop members are attached to the exterior surfaces. In yet a further exemplary embodiment, a bracket may be attached to an exterior surface of one support member while the other bracket is attached to an interior surface of the other support member, and the stop members are attached to their respective opposite surfaces.

Figure 3:
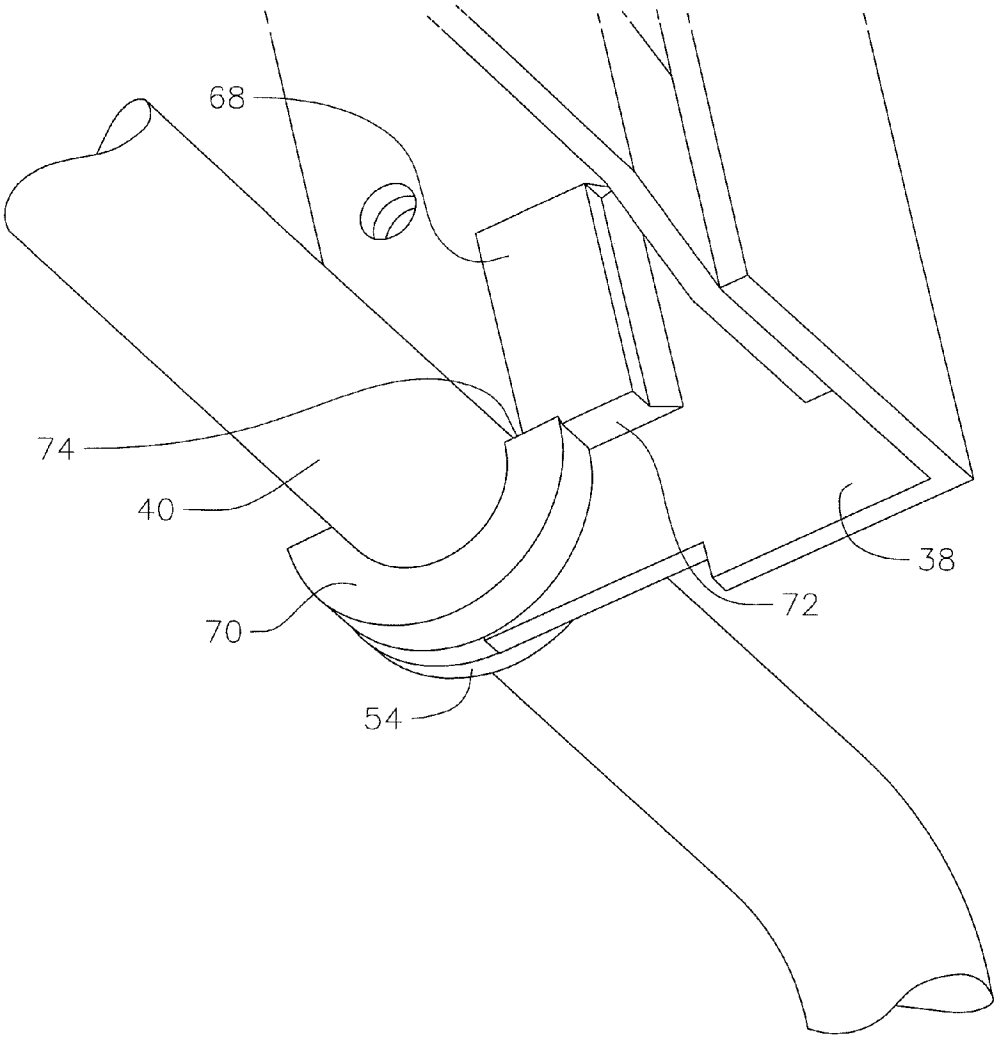
FIG. 3 is a partial perspective view of the frame shown in FIG. 1 showing a stop bracket and stop member incorporated in the frame.

Stop brackets 70 and 70' are attached or otherwise formed on the main section 40 of the frame platform portion so as to be able to make contact with a stop surface 72, (72' not shown) of the stop members 68, 68'. In an exemplary embodiment as shown in FIGS. 1, 2 and 3, the stop brackets 70, 70' are arcuate members welded onto the main section of the frame platform portion. The stop brackets 70, 70' are positioned such that when the frame platform portion is rotated relative to the frame base portion at an angle so that the frame platform portion is generally horizontal, a stop surface 74, (74' not shown) of the stop bracket contacts the corresponding stop surface 72, 72' of the stop members, preventing the further rotation of the frame platform portion relative to the frame base portion. In the shown exemplary embodiment, the stop bracket contacts the corresponding stop surface at a level not higher and not lower than the level of the tubular main section 40. In this regard the stop mechanism defined by the stop bracket and the stop surface remains compact. It should be noted that when the stop surface of the stop bracket engages the stop surface of the stop member, the load applied to each stop bracket is reacted as a hoop shear stress between the stop bracket and the tubular main section 40 of the frame platform portion along the outer surface of the tubular main section 40. This provides for a larger contact area length between the stop bracket of the main generally tubular section, thus allowing a larger load to be reacted through the stop bracket, i.e., allowing the stop bracket to withstand a higher load prior to failing, e.g., separating from the main tubular section. The load that may be carried by the stop members may be increased by increasing the contact area between each stop member and the structure on which it is mounted. For example, this may be accomplished by using an arcuate stop member that has a longer arc and thus, is attached along a longer circumferential portion of the tubular main section 40. It may also be accomplished by using wider stop members.

In an exemplary embodiment, an actuator 67 is mounted at one end on the bracket 62, attached to the main section 40 and at the other end on the bracket 65 extending from the transverse member 18. The actuator provides a force to rotate the frame platform portion to the first position (i.e., the closed position) generally parallel to the frame base portion. Typically, the actuator has a housing 69 from which extends a housing bracket 71 having an opening. A pin 73 is fitted through such opening and through an opening formed on the bracket 65 to pivotable couple the base to the housing bracket. A piston extends into the housing and has an arm 75 having an opening. A pin 77 is fitted through this opening and an opening formed on the bracket 62 coupling the arm and thus, the actuator to the bracket 62. In this regard, as the frame platform portion is moved toward the frame base portion, the actuator provides a force on the bracket 62, pushing the bracket downward and causing the frame platform portion to rotate upward toward a closed position. As such, the actuator provides a self-closing function to the BCS, in that as the platform is rotated from the open position toward the closed position, the actuator exerts a force to smoothly close the BCS by moving the platform to the closed position relative to the base. In an exemplary embodiment, the actuator is a gas piston and is positioned such that when the platform is moved from an open position, relatively perpendicular to the base, to a position of about 45° relative to the base. The actuator also ensures that the platform does not rotate from the closed position toward the open position without the exertion of an external force, as for example a force applied by a user to open the platform relative to the base. With this exemplary embodiment, a force must be applied to rotate the platform more than 45° from the base. In an exemplary embodiment, an actuator is made Stabilus GmbH. These actuators are sometimes referred to in the industry as shocks in that they also act as shock absorbers.

Figure 4:
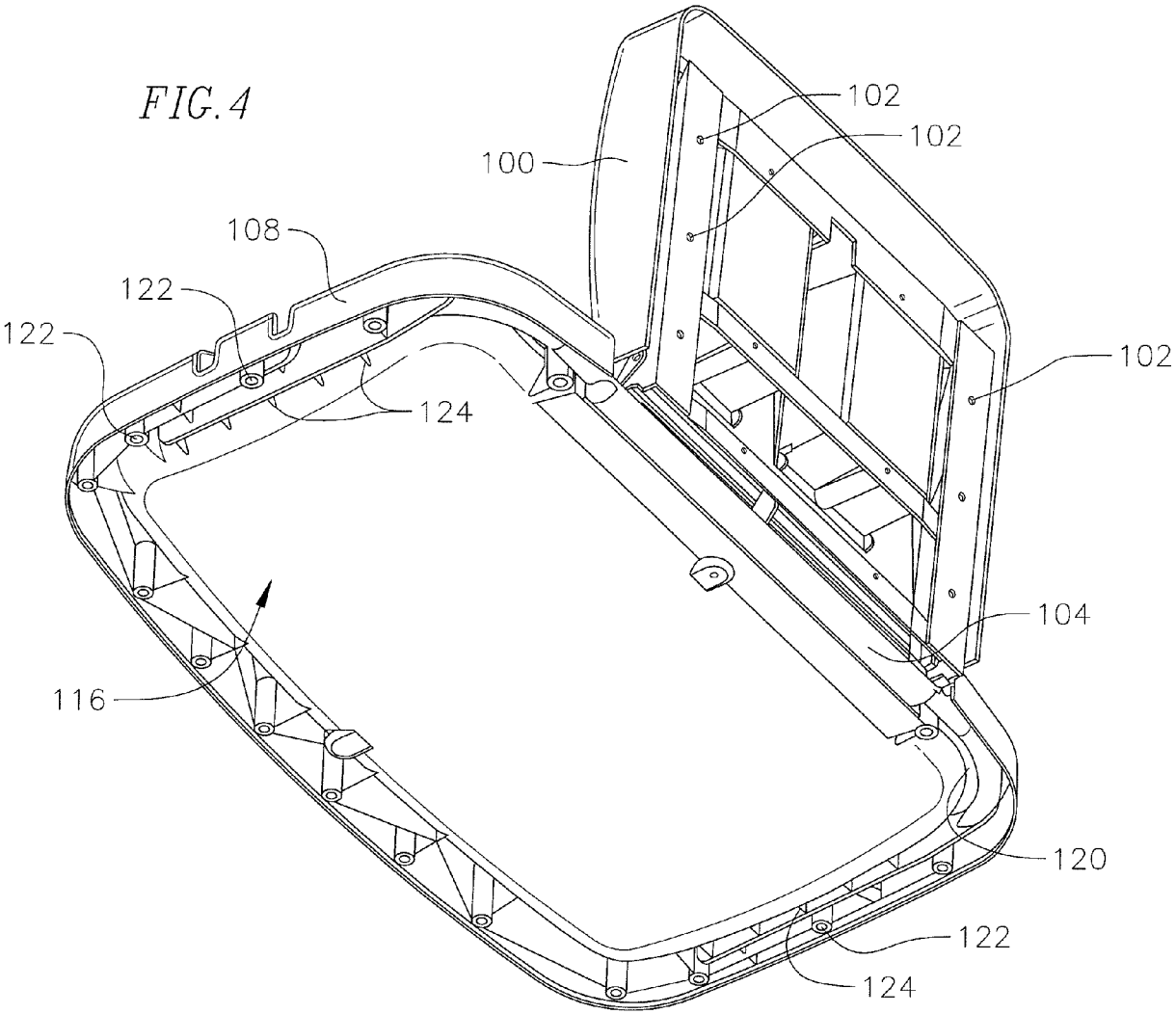
FIG. 4 is a bottom perspective view of an exemplary embodiment baby changing station incorporating the frame shown in FIG. 1 absent a lower piece of a platform.
Figure 5:
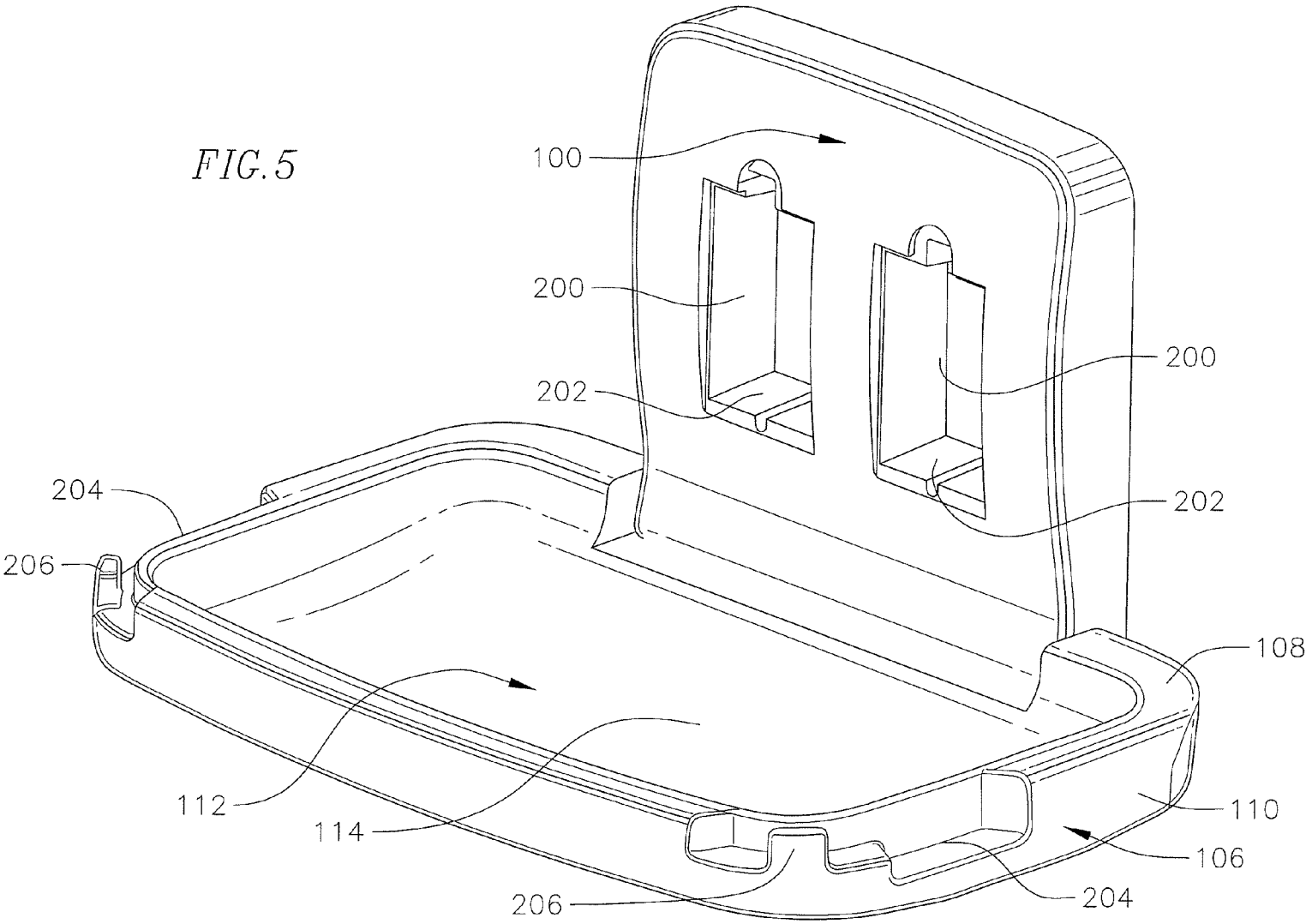
FIG. 5 is a perspective view of an exemplary embodiment baby changing station of the present invention.

In an exemplary embodiment, the frame base portion is mounted onto a wall. The frame may be bolted onto a wall or otherwise fastened or attached to a wall using other fasteners and/or adhesives. A base cover 100 forming the base is mounted over the frame so as to hide the frame. The base cover may be mounted onto the frame or may be mounted directly onto the wall. In an exemplary embodiment, the frame base portion is placed against the wall, and the base cover is then placed over the frame base portion. Fasteners are then used to fasten the base cover onto the frame through fastener openings 102 and onto the wall (FIG. 4). In other words, the fasteners are used to fasten both the frame and the cover to the wall. In an exemplary embodiment as shown in FIGS. 4 and 5, the base cover, when mounted over the base frame portion, covers the base frame portion as well as the portion 104 of the main member of the frame platform portion between the support members 38, 38'.

A platform 106 in an exemplary embodiment is formed in two pieces, an upper piece 108 and a lower piece 110. The upper piece has an external surface 112 defining a support surface 114. On its inner surface 116, the upper piece defines a gap 120 for receiving the frame platform portion. In the exemplary embodiment, where the base cover covers the portion 104 of the frame platform portion main member, the remaining portion of the frame platform portion is received in the gap 120. It should be noted that the gap may be a groove or defined by spaced apart structures as for example pegs 122 which are spaced apart from ribs 124. In an exemplary embodiment, the gap has a width that varies as necessary for accommodating the various portions of the frame platform portion with minimal sideway play. In another exemplary embodiment, the gap may be defined entirely on the lower piece, or entirely on the upper piece, or partly on each of the upper and lower pieces. In another exemplary embodiment, a gap may or may not be used and the platform upper piece is fastened on the frame platform portion using fasteners or by having features that would allow it to snap onto the frame platform portion. The lower piece 110 may in an exemplary embodiment be fastened to the upper piece and/or to the frame platform portion sandwiching the frame platform portion between the upper and lower pieces. In other exemplary embodiments, the two platform pieces may be "snap" fitted together. In another exemplary embodiment, the platform may be formed as a single piece that that has rear openings for receiving the frame platform portion arms. In an exemplary embodiment, the platform, whether formed in two pieces, or a single member having openings to accommodate the frame platform portion, may be formed by blow molding. The base cover may also be formed blow molded.

In another exemplary embodiment, any of the platform, platform pieces and/or the base cover may be formed by other methods such as injection molding. In other exemplary embodiments, plastics, resinous, metallic or other materials may be used to form the base cover or the platform or platform pieces.

Figures 6, 7A:
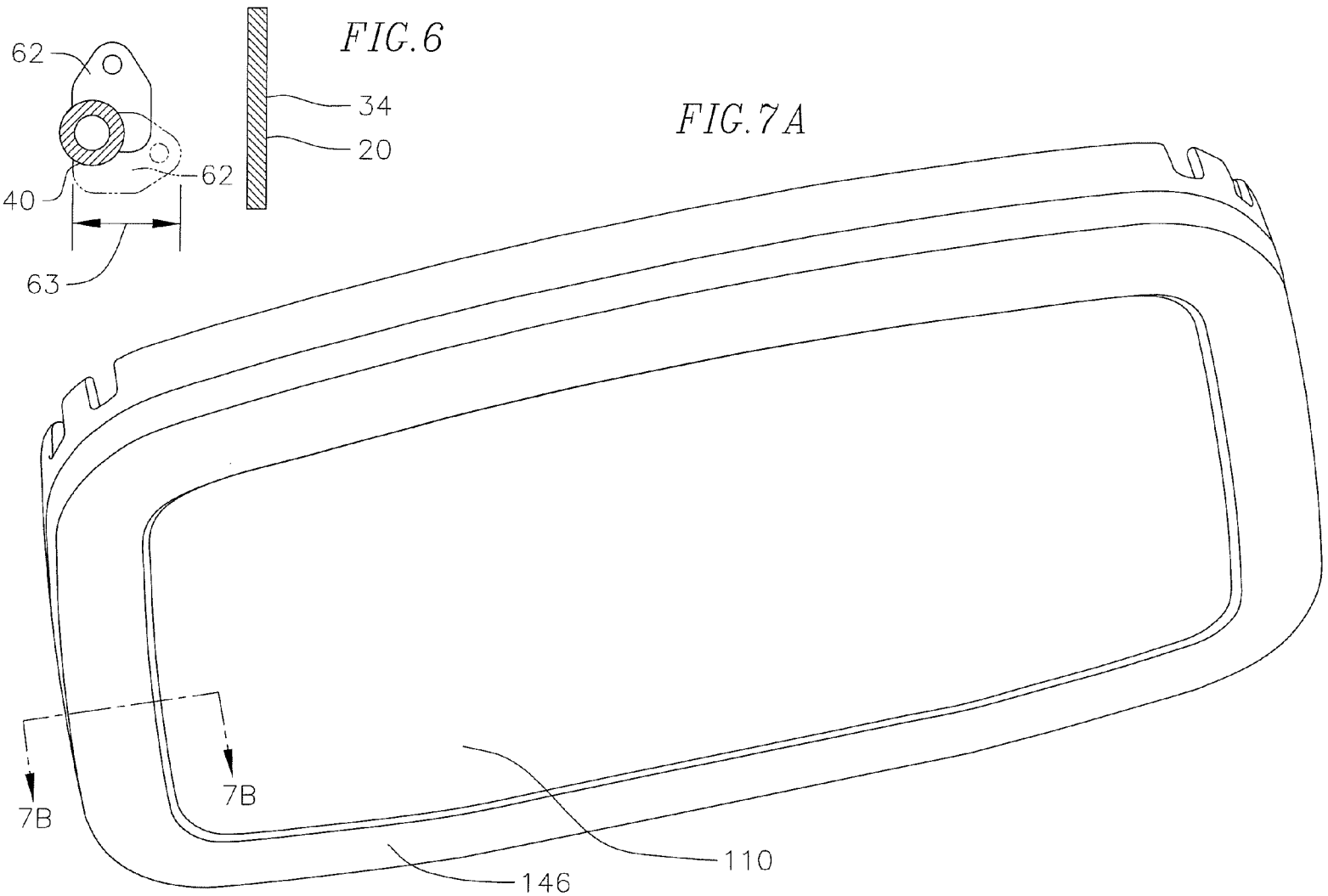
FIG. 6 is a cross-sectional view taken along arrows 6-6 shown in FIG. 1.
FIG. 7A is a perspective view of platform of baby changing station of the present invention including a trim piece.
Figure 7B:
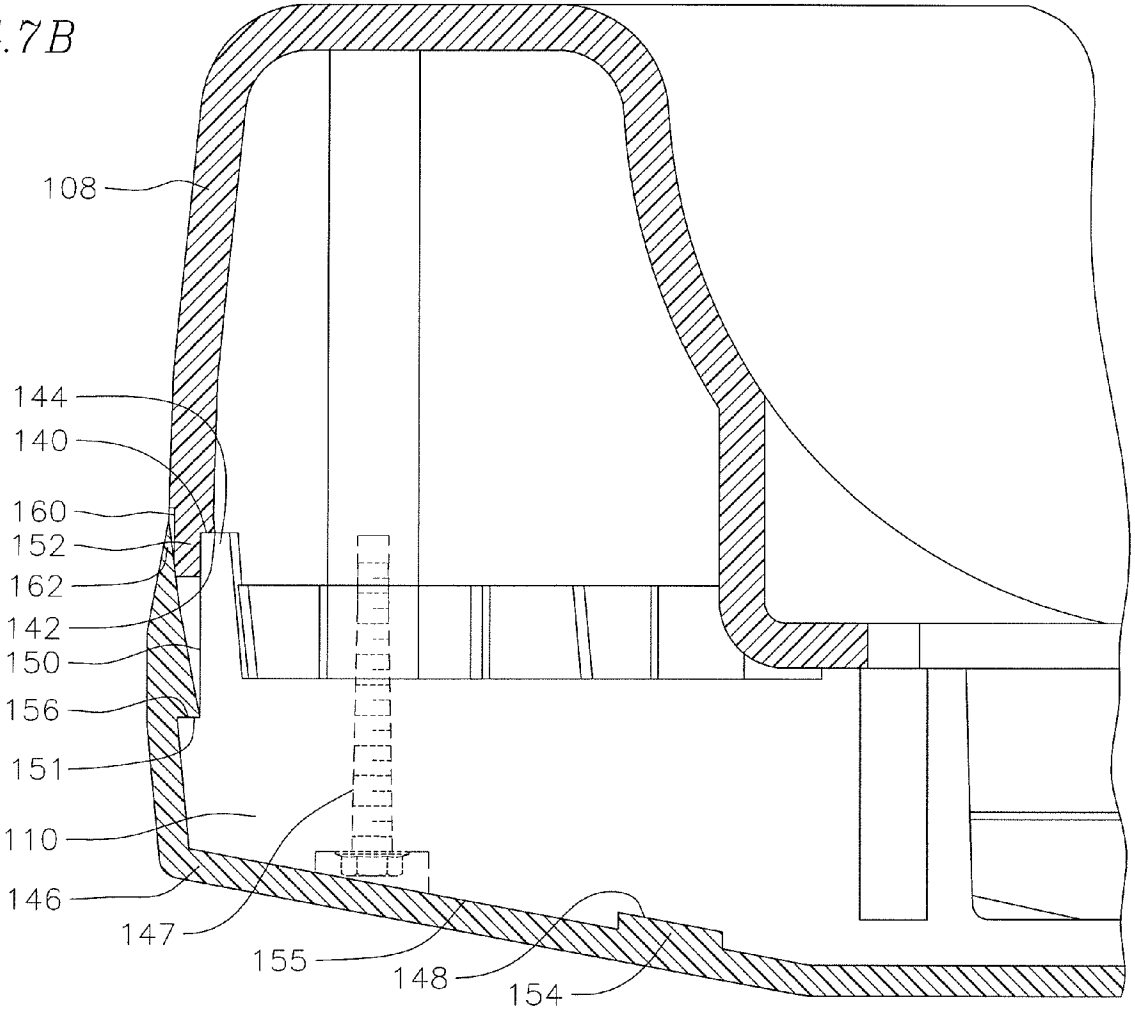
FIG. 7B is a partial cross-sectional view of the platform shown in FIG. 7A taken along arrows 7B-7B.

In another exemplary embodiment, the platform upper piece 108 may be formed with a shoulder 140 proximate the peripheral edge of the upper piece. In the exemplary embodiment shown in FIG. 7B, the shoulder is formed interior of the platform upper piece. When the platform lower piece 110 is mated with the platform upper piece, a peripheral edge 144 of the platform lower piece sits on the shoulder 140 formed on the proximate to the peripheral edge of the platform upper piece. In yet a further exemplary embodiment as shown in FIGS. 7A and 7B, a trim piece 146 is mounted over a peripheral portion of the platform lower piece. The trim piece is used in an exemplary embodiment to hide the fasteners 147, may be used to connect the lower piece to the upper piece to define the platform. In an exemplary embodiment, the platform lower piece is defined with a peripheral annular depression 148. In a further exemplary embodiment, instead of a peripheral annular depression 148, a plurality of depressions 148 which are spaced apart or are arranged along a peripheral portion of the platform lower piece. In addition, a platform lower piece shoulder 150 is defined proximate the peripheral edge 144 of the platform lower piece. In the exemplary embodiment shown in FIGS. 7A and 7B, the trim piece is such that it covers the exposed side portion 150 of the platform lower piece and extends over an edge portion 152 of the platform upper piece. In the shown exemplary embodiment, the trim piece 146 includes projection(s) 154 to be received in the depression(s) 148. If an annular depression 148 is formed on the lower piece, than the trim piece includes a complementary annular projection 154 extending from an inner surface 155 of the trim piece. If spaced apart depressions 148 are formed on the lower piece, then complementary projections 154 extend from the inner surface on the trim piece. In addition, a circumferential shoulder 156 is defined on the interior surface of the trim piece which surrounds the side surface 150 of the platform of lower piece for mating with the shoulder 151 formed on the side surface of the platform lower piece.

When mounting the trim piece on the platform lower piece, the projection(s) 154 are pushed into the depression(s) 148 of the platform lower piece while at the same time the shoulder 156 of the trim piece seats against the shoulder 151 on the platform lower piece. The distance between the shoulder 156 formed on the trim piece and the projection 154 are such that a slight tension is provided between the shoulder 156 and the projection 154 which causes the trim piece to clamp on the platform lower piece. In this regard, the trim piece easily connects to the platform lower piece by snapping onto position.

In the shown exemplary embodiment, the edge of the trim piece extends over the edge portion 152 of the platform upper piece. In the shown exemplary embodiment, a recess 160 is defined along the platform upper piece edge portion 152 which receives an edge portion 162 of the trim piece. In the shown exemplary embodiment, the trim piece extends at a distance beyond the shoulder 140 defined on the platform upper piece in a direction away from the platform lower piece.

The baby changing station of the present invention may be mounted on a wall using different approaches. In one exemplary embodiment, the frame base portion is mounted, e.g. is fastened on a wall. The platform piece(s) may then be attached to the frame platform portion and the base cover is placed over the frame base portion and fastened to the frame base portion or directly to the wall. In one exemplary embodiment, the frame platform portion is separated from the base frame base portion by unfastening the brackets 54 and 54' from the frame base portion and by disconnecting the actuator 67, if used, from the frame platform portion, i.e., from the bracket 62 extending the base platform portion (or from the frame base portion, i.e. from the bracket 65) or from both frame portions. In another exemplary embodiment, the frame base portion is not connected to the frame platform portion. With this exemplary embodiment, the frame base portion does not have to be disconnected from the frame platform portion as the two frame portions are already disconnected.

With these embodiments, the frame base portion is fastened or otherwise attached to the wall. The platform piece or pieces are then attached to the frame platform portion forming the platform 106. The platform is then attached to the frame base portion by connecting the frame platform portion to the frame base portion by positioning the brackets 54 and 54' around the frame platform portion main section 40 and fastening such brackets on to their corresponding support member 38, 38' of the frame base portion. The actuator, if used in then attached to the frame portion(s) so that it is connected to both frame portions. The base cover is then fastened to the frame base portion or directly to the wall and covers the frame base portion. This exemplary embodiment makes installation easier as the installer installs the baby changing station in sections.

As can be seen in one exemplary embodiment, the frame may be mounted onto a wall by securing the frame base portion onto a wall and the base cover and the pieces forming the platform are fitted over their corresponding frame portions afterwards. In this regard when the base cover and/or platform pieces are worn or mutilated, they may be easily replaced without having to replace the frame. In other words, the base cover and platform pieces may be removed exposing the entire frame which may then be outfitted with another base cover and platform pieces.

In an exemplary embodiment, the base cover forming the base may be formed with one or more depressions 200, as for example shown in FIG. 5 which provide shelves 202 for storing materials which are used when changing diapers, as for example lotions and the like. In addition, in the exemplary embodiment shown in FIG. 5, the base is much narrower than the platform such that when the platform is closed relative to the base, it completely encapsulates the base. With this exemplary embodiment, depressions 204 are formed on opposite ends of the platform to provide grips for allowing the user to pull and rotate the platform relative to the base such that the platform comes to a horizontal position where the stop brackets engage their corresponding stop members. In addition, the platform may be formed with pegs 206 to allow the user to hang their bags, as for example, a diaper bag.

As can be seen with the exemplary embodiment BCS, the loads applied to the BCS, for example by the weight of a baby or a person leaning on the BCS platform and all reacted onto the frame which due to its design is capable of withstanding higher loads and especially loads greater than those that are withstood by conventional baby changing stations which typically react the loads on their plastic base and platform. In this regard, the base cover and platform do not have to react the such loads. Consequently they may be formed from materials of lower strength.

Although the present invention has been described and illustrated to respect to multiple embodiments thereof, it is to be understood that it is not to be so limited, since changes and modifications may be made therein which are within the full intended scope of this invention as hereinafter claimed. For example, in another exemplary embodiment, the frame base portion may only have two lateral members as for example, members 16 and 16' that are directly mounted onto to a wall. Support members 38 and 38' extend from the lateral members. This embodiment does not require that the frame base portion include the transverse members.

What is claimed is:

1. A baby supporting device comprising:

a frame comprising, a base portion for mounting onto a wall, a platform portion pivotally coupled to the base portion, said platform portion comprising a rotatable section, wherein at least a portion of said rotatable section rotates about a longitudinal axis, and two spaced apart arms extending from the rotatable section, said rotatable section rotating about the longitudinal axis, *wherein a first of said two spaced apart arms extends longitudinally from the rotatable section along a first axis, wherein a second of said two spaced apart arms extends longitudinally from the rotatable section along a second axis, and wherein the longitudinal axis intersects the first and second axes,* wherein the base portion comprises a bracket, wherein said bracket surrounds at least a portion of and supports said platform portion rotatable section at a location between said arms and allows said platform portion rotatable section to rotate within said bracket relative to said bracket about said longitudinal axis, wherein rotation of said rotatable section causes said platform portion to pivot relative to said base portion, a first stop member extending from said rotatable section, and a second stop member extending from said base portion, wherein said second stop member is engagable by said first stop member for stopping the rotation of the rotatable section in a first direction; and a platform for supporting the baby extending over at least a portion of said frame platform portion, wherein said platform comprises a first portion defining a supporting surface for supporting said baby and a second portion, wherein said arms are sandwiched between said first and second platform portions.

2. The device as recited in claim 1 further comprising an actuator connected to the base portion and the platform portion for providing a force for urging the platform portion to rotate toward the base portion.

3. The device as recited in claim 1 wherein the first stop member is an arcuate member, wherein the frame platform portion rotatable section is a tubular member, and wherein said arcuate member is connected to said tubular member outer surface.

4. The device as recited in claim 1 comprising another bracket coupled to the base portion, said another bracket being spaced apart from said bracket and surrounding at least a portion of and supporting said platform portion rotatable section and allowing said platform portion rotatable section to rotate relative to said another bracket.

5. The device as recited in claim 1 wherein the second stop member engages the first stop member at a location, said location being at a level not above and not below said rotatable section.

6. The device as recited in claim 1 wherein the arms are welded to the rotatable section.

7. The device as recited in claim 1 wherein the rotatable section extends from a first end to a second end and one of the arms extends from the first end and the other of the arms extends from the second end.

8. The device as recited in claim 1 wherein the stop members are located adjacent to said location.

[9. The baby supporting device of claim 1 wherein said bracket is coupled to said base portion.]

10. A baby supporting device comprising:

a frame comprising, a base portion for mounting onto a wall, a platform portion pivotally coupled to the base portion, said platform portion comprising a rotatable section, wherein at least a portion of said rotatable section rotates about a longitudinal axis, and two spaced apart arms extending from the rotatable section, said rotatable section penetrating the base portion at least at a location and rotating about the longitudinal axis, whereby the location is between said arms, wherein said base portion surrounds and supports at least a portion of said rotatable section, *wherein a first of said two spaced apart arms extends longitudinally from the rotatable section along a first axis, wherein a second of said two spaced apart arms extends longitudinally from the rotatable section along a second axis, and wherein the longitudinal axis intersects the first and second axes,* a first stop member extending from said rotatable section, and a second stop member extending from said base portion, wherein said second stop member is engagable by said first stop member for stopping the rotation of the rotatable section in a first direction; and a platform for supporting the baby extending over at least a portion of said frame platform portion, wherein said platform comprises a first portion defining a supporting surface for supporting said baby and a second portion, wherein said arms are sandwiched between said first and second platform portions.

11. The device as recited in claim 10 wherein the second stop member engages the first stop member at a location, said location being at a level not above and not below said rotatable section.

12. The device as recited in claim 10 wherein the arms are welded to the rotatable section.

13. The device as recited in claim 10 wherein the rotatable section extends from a first end to a second end and one of the arms extends from the first end and the other of the arms extends from the second end.

14. The device as recited in claim 10 wherein the stop members are located adjacent to said location.

15. A baby supporting device comprising:

a frame comprising, a base portion for mounting onto a wall, a platform portion pivotally coupled to the base portion, said platform portion comprising a rotatable section, wherein at least a portion of said rotatable section rotates about a longitudinal axis, and two spaced apart arms extending from the rotatable section, said rotatable section rotating about the longitudinal axis, wherein the base portion comprises a bracket, wherein said bracket surrounds at least a portion of and supports said platform portion rotatable section at a location between said arms and allows said platform portion rotatable section to rotate within said bracket relative to said bracket about said longitudinal axis, wherein rotation of said rotatable section causes said platform portion to pivot relative to said base portion, a first stop member extending from said rotatable section, and a second stop member extending from said base portion, wherein said second stop member is engagable by said first stop member for stopping the rotation of the rotatable section in a first direction; and a platform for supporting the baby extending over at least a portion of said frame platform portion, wherein the arms are welded to the rotatable section.

16. A changing station for supporting a small person, the changing station comprising:

a platform that is rotatable from a vertical storage position to a horizontal use position along a rotational axis, the platform comprising a top portion and a bottom portion;

a support structure having a rotatable support member that is rotatable along the rotational axis, and two extending members extending out at an angle from the *rotatable* support member and encapsulated between the top and bottom portions of the platform, the rotatable support member comprising an elongate tube and the rotational axis being a central longitudinal axis of the elongate tube*, wherein a first of said two extending members extends longitudinally from the rotatable support member along a first axis, wherein a second of said two extending members extends longitudinally from the rotatable support member along a second axis, wherein the rotational axis intersects the first and second axes*;

a mounting structure for mounting the support structure to a vertical surface, the mounting structure comprising a pair of spaced apart mounting brackets and a central bracket, wherein the central bracket is spaced from the rotatable support member and extends between the mounting brackets;

a pair of open/close stops mounted to the mounting structure; and a pair of hinge stops mounted to the rotatable support member at a location spaced inwardly between the two extending members, each hinge stop having at least one surface extending away from the elongate tube in a radially outward direction such that the at least one surface of each hinge stop engages a respective one of the pair of open/close stops for controlling the rotation of the rotatable support member at least when the platform is in the horizontal use position.

17. The changing station of claim 16, further comprising at least one damper system configured to slow the rotation of the platform when the platform moves from the vertical storage position to the horizontal use position.

18. The changing station of claim 17, wherein the damper system comprises at least one gas spring attached between the rotatable support member and the central bracket of the mounting structure.

19. The changing station of claim 18, wherein the gas spring compresses as the platform is moved from the vertical storage position to the horizontal use position, and extends when the platform is moved from the horizontal use position to the vertical storage position.

20. The changing station of claim 16, wherein the platform is constructed of a plastic and the support structure is constructed of a metal.

21. The changing station of claim 16, wherein each hinge stop includes a cut-out that aligns with a cross-section of the elongate tube of the support member.

22. The changing station of claim 16, wherein the mounting brackets of the mounting structure are spaced inwardly between the two extending arms of the support structure.

*23. The device of claim 15, wherein a first of said two spaced apart arms extends longitudinally from the rotatable section along a first axis, wherein a second of said two spaced apart arms extends longitudinally from the rotatable section along a second axis, and wherein the longitudinal axis intersects the first and second axes.*

* * * * *